United States Patent
Chang et al.

(10) Patent No.: US 11,507,707 B2
(45) Date of Patent: Nov. 22, 2022

(54) TAMPER PROOF MECHANISM FOR AN INFORMATION HANDLING SYSTEM

(71) Applicant: Dell Products L.P., Round Rock, TX (US)

(72) Inventors: Yaotsung Chang, Taipei (TW); Chia-min Sun, Taipei (TW)

(73) Assignee: Dell Products L.P., Round Rock, TX (US)

( * ) Notice: Subject to any disclaimer, the term of this patent is extended or adjusted under 35 U.S.C. 154(b) by 503 days.

(21) Appl. No.: 16/672,760

(22) Filed: Nov. 4, 2019

(65) Prior Publication Data

US 2021/0133364 A1 May 6, 2021

(51) Int. Cl.
| | |
|---|---|
| *G06F 21/86* | (2013.01) |
| *G06F 1/18* | (2006.01) |
| *E05B 47/00* | (2006.01) |
| *E05B 73/00* | (2006.01) |
| *G06F 1/16* | (2006.01) |

(52) U.S. Cl.
CPC .......... *G06F 21/86* (2013.01); *E05B 47/0038* (2013.01); *E05B 73/0082* (2013.01); *G06F 1/182* (2013.01); *G06F 1/1616* (2013.01)

(58) Field of Classification Search
CPC ........ G06F 21/86; G06F 1/182; G06F 1/1616; E05B 47/0038; E05B 73/0082
See application file for complete search history.

(56) References Cited

U.S. PATENT DOCUMENTS

| | | | |
|---|---|---|---|
| 8,228,299 B1* | 7/2012 | Maloney | G06F 3/03543 345/173 |
| 10,133,385 B1* | 11/2018 | Maloney | G06T 7/20 |
| 10,370,872 B2* | 8/2019 | Pfunder | E05B 47/0001 |
| 10,847,868 B2* | 11/2020 | Anderson, III | H01Q 1/22 |
| 10,890,015 B2* | 1/2021 | Pavlovic | G07C 9/00309 |
| 2019/0386374 A1* | 12/2019 | Casto | H01Q 1/2291 |
| 2020/0011093 A1* | 1/2020 | Ullrich | E05B 47/0012 |

* cited by examiner

*Primary Examiner* — Hosuk Song
(74) *Attorney, Agent, or Firm* — McDermott Will & Emery LLP (57) ABSTRACT

An information handling system, including a chassis; a bottom door coupled to the chassis; an assembly, including a bracket coupled to the chassis, the bracket including an opening; a slider moveably coupled within the bracket, the slider including a cavity at least partially in superimposition with the opening; a nut positioned within the cavity, the nut including a threaded opening; and a fastener positioned through an opening of the bottom door and within the threaded opening of the nut to position the bottom door such that the bottom door abuts the chassis, wherein when the slider is in a first positional state with respect to the bracket, the nut is constrained within the cavity, wherein when the slider is in a second positional state with respect to the bracket, the nut is rotatable within the cavity.

17 Claims, 10 Drawing Sheets

TAMPER PROOF MECHANISM FOR AN INFORMATION HANDLING SYSTEM

BACKGROUND

Field of the Disclosure

The disclosure relates generally to information handling systems, and in particular, security apparatuses to prevent unwanted tampering of hardware of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computing system security can provide solutions to protect customer's systems safe. Security locks used at computing systems can be unfastened, and hardware of the computing system can be tampered with.

SUMMARY

Innovative aspects of the subject matter described in this specification may be embodied in an information handling system, including: a chassis; a bottom door coupled to the chassis; an assembly, including: a bracket coupled to the chassis, the bracket including an opening; a slider moveably coupled within the bracket, the slider including a cavity at least partially in superimposition with the opening; a nut positioned within the cavity, the nut including a threaded opening; and a fastener positioned through an opening of the bottom door and within the threaded opening of the nut to position the bottom door such that the bottom door abuts the chassis, wherein when the slider is in a first positional state with respect to the bracket, the nut is constrained within the cavity, wherein when the slider is in a second positional state with respect to the bracket, the nut is rotatable within the cavity.

These and other embodiments may each optionally include one or more of the following features. For instance, further including a security lock that is insertable through the chassis, the security lock engaging and disengaging the slider. When the security lock engages the slider, the slider is in the second positional state with respect to the bracket, and when the security lock disengages the slider, the slider is in the first positional state. The assembly further includes a spring positioned between the bracket and the slider, the spring applying a tensional force to the slider to facilitate transitioning the slider from the second positional state to the first positional state. The spring maintains the slider in the first positional state. The slider further includes a magnetic portion, the magnetic portion applying a magnetic force to the slider to facilitate transitioning the slider from the second positional state to the first positional state. The magnet maintains the slider in the first positional state. The assembly is positioned at a first end of the information handling system opposite a second end of the information handling system, wherein the bottom door is rotatable coupled to the chassis at the second end of the information handling system. The cavity of the slider includes a first cavity portion and a second cavity portion, wherein when the slider is in the first positional state with respect to the bracket, the nut is positioned within the first cavity portion, and wherein when the slider is in in the second positional state with respect to the bracket, the nut is positioned within the second cavity portion. The nut has a first geometric shape and the first cavity portion have a second geometric shape that couples the slider to the nut. The second cavity portion has a third geometric shape that facilitates rotation of the nut within the second cavity portion. The first and the second geometric shape is hexagonal, and the third geometric shape is circular.

Innovative aspects of the subject matter described in this specification may be embodied in a fastening mechanism, including: an assembly, including: a bracket coupled to the chassis, the bracket including an opening; a slider moveably coupled within the bracket, the slider including a cavity at least partially in superimposition with the opening; a nut positioned within the cavity, the nut including a threaded opening; and a fastener positioned through an opening of the bottom door and within the threaded opening of the nut to position the bottom door such that the bottom door abuts the chassis, wherein when the slider is in a first positional state with respect to the bracket, the nut is constrained within the cavity, wherein when the slider is in a second positional state with respect to the bracket, the nut is rotatable within the cavity.

These and other embodiments may each optionally include one or more of the following features. For instance, the assembly further includes a spring positioned between the bracket and the slider, the spring applying a tensional force to the slider to facilitate transitioning the slider from the second positional state to the first positional state. The spring maintains the slider in the first positional state. The slider further includes a magnetic portion, the magnetic portion applying a magnetic force to the slider to facilitate transitioning the slider from the second positional state to the first positional state. The magnet maintains the slider in the first positional state. The cavity of the slider includes a first cavity portion and a second cavity portion, wherein when the slider is in the first positional state with respect to the bracket, the nut is positioned within the first cavity portion, and wherein when the slider is in in the second positional state with respect to the bracket, the nut is positioned within the second cavity portion. The nut has a first geometric shape and the first cavity portion have a second geometric shape that couples the slider to the nut. The second cavity portion has a third geometric shape that facilitates rotation of the nut within the second cavity portion.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes a tamper-proof mechanism for securing a system chassis of an information handling system. Specifically, this document describes integration of a tamper-proof mechanism with a security lock bracket such that a system chassis can not be unfastened while the security lock is engaged. Once the security lock is engaged, the tamper-proof mechanism will be activated, and an insert nut will be self-rotating such that a screw cannot be unfastened from the chassis.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
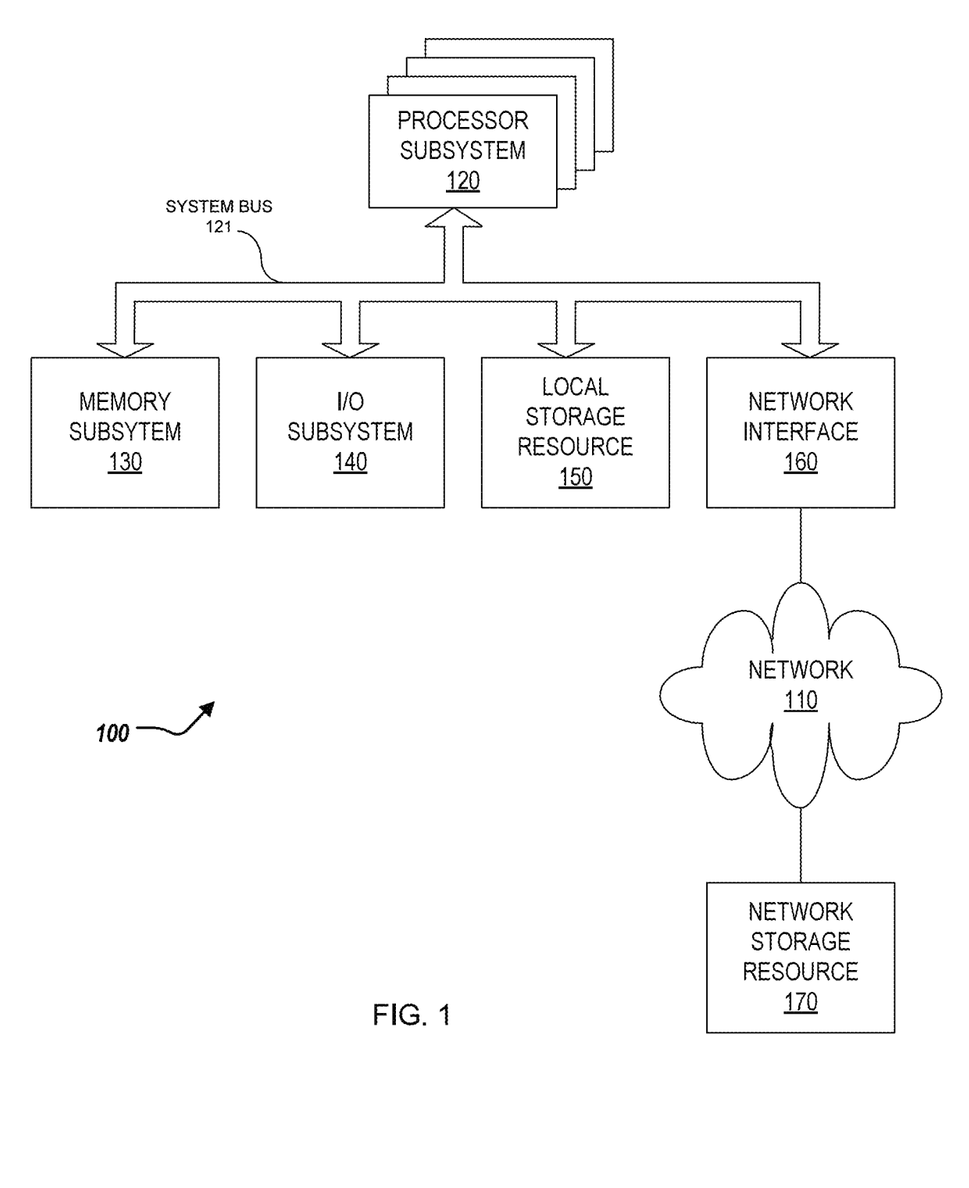
FIG. 1 is a block diagram of selected elements of an embodiment of an information handling system.
Figure 2:
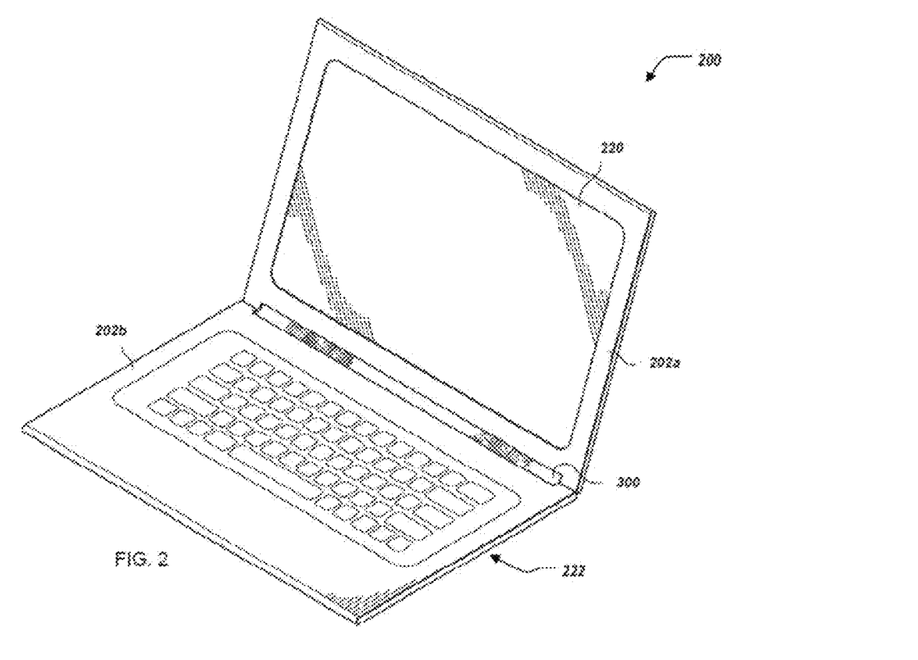
FIG. 2 is a perspective view of a computing system.
Figure 3:
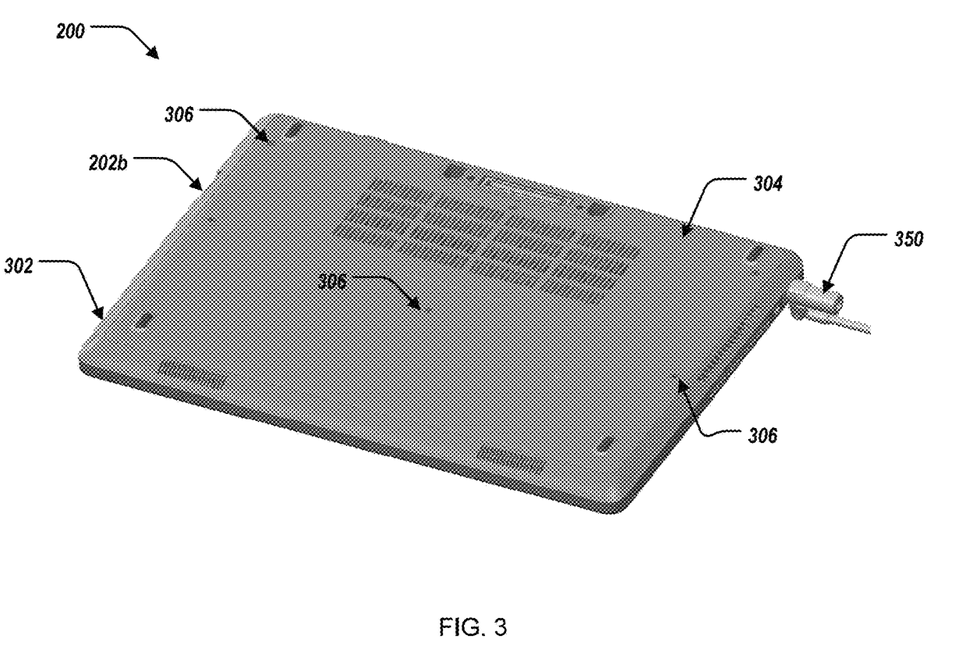
FIG. 3 is a bottom view of the computing system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, T1, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning now to FIG. 2, FIG. 2 illustrates a perspective view of a computing system 200. The computing system 200 includes a first body 202a and a second body 202b. The computing system 200 can be similar to the information handling system 100 of FIG. 1. In some examples, the first body 202a can include a display 220 and the second body 202b can include a keyboard 222 (and typically also include computing components).

FIG. 3 illustrates a bottom view of the computing system 200, and in particular, the second body 202b. The second body 202b can include a chassis 302 and a bottom door 304. The bottom door 304 can be removably coupled (attached) to the chassis 302. In some examples, the bottom door 304 can be coupled to the chassis 302 with one or more fasteners 306, such as screws.

Figure 4:
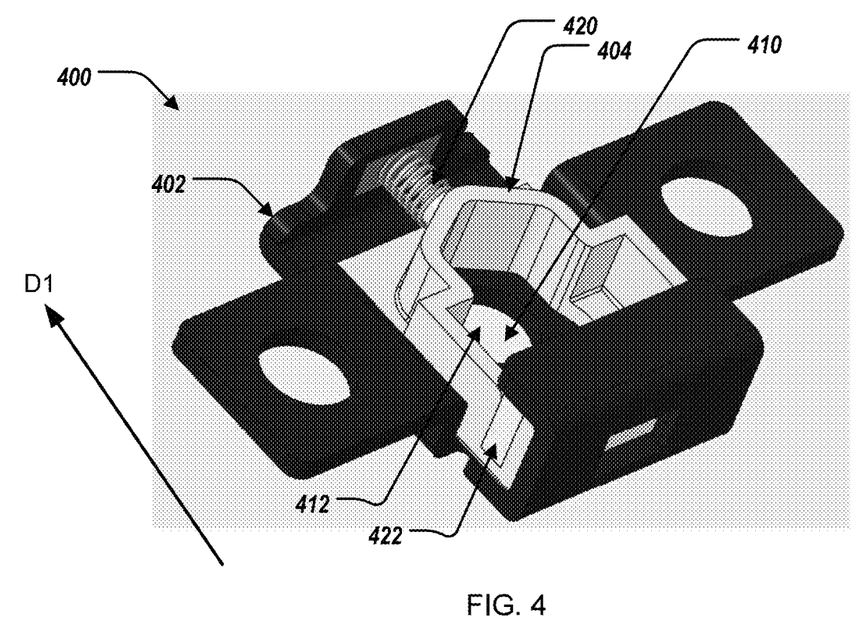
FIGS. 4-6 illustrate a fastening assembly included by the computing system.
Figure 5:
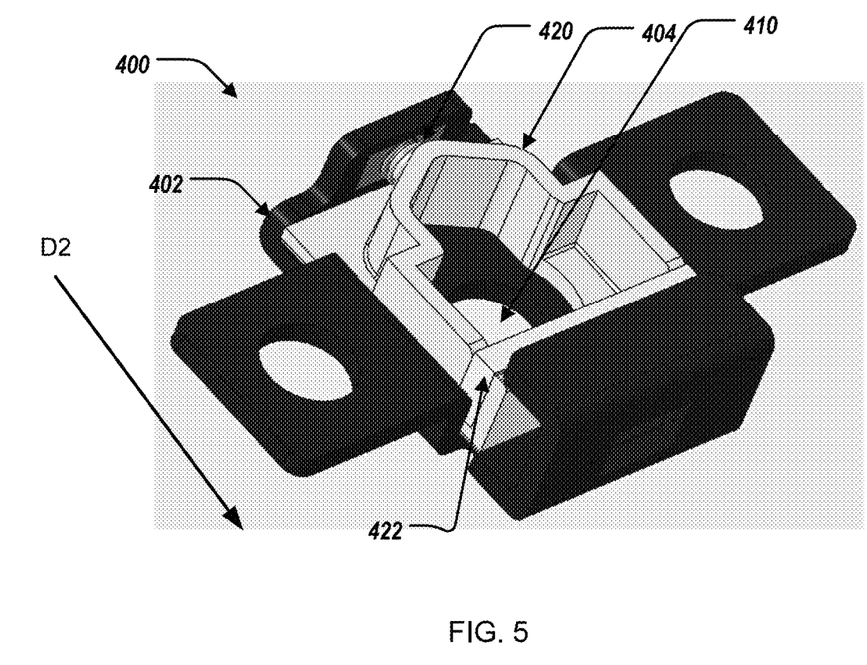
Figure 6:
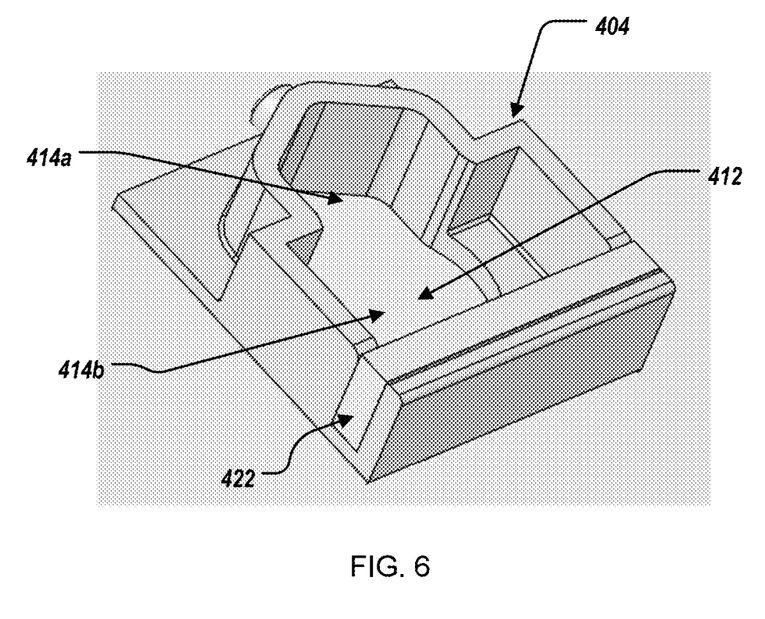

FIG. 4-6 illustrates a fastening assembly 400 that can be included by the computing system 200. Specifically, the fastening assembly 400 includes a bracket 402 and a slider 404. The slider 404 can be moveably coupled within the bracket 402. For example, the slider 404 can move in a direction D1 (as shown in FIG. 4) and/or a direction D2 (as shown in FIG. 5). The bracket 402 can include an opening 410, as shown in FIGS. 4 and 5, and the slider 404 can include a cavity 412, as shown in FIG. 6. As shown in FIG. 4, the cavity 412 of the slider 404 can at least partially be in superimposition with the opening 410 of the bracket 402.

Referring to FIG. 6, the cavity 412 of the slider 404 can include a first cavity portion 414a and a second cavity portion 414b (collectively referred to as cavity portions 414). In some examples, the first cavity portion 414a can include at least a portion of a hexagonal geometric shape. In some examples, the second cavity portion 414b can include at least a portion of a circular geometric shape.

As shown in FIGS. 4 and 5, the assembly 400 can further include a spring 420 positioned between the bracket 402 and the slider 404. The spring 420 can facilitate translation of the slider 404 with respect to the bracket 402 along the direction D2, described further herein. As shown in FIGS. 4 and 6, the slider 404 can further include a magnetic portion 422. The magnetic portion 422 can facilitate translation of the slider 404 with respect to the bracket 402 along the direction D2, described further herein.

Figure 7A:
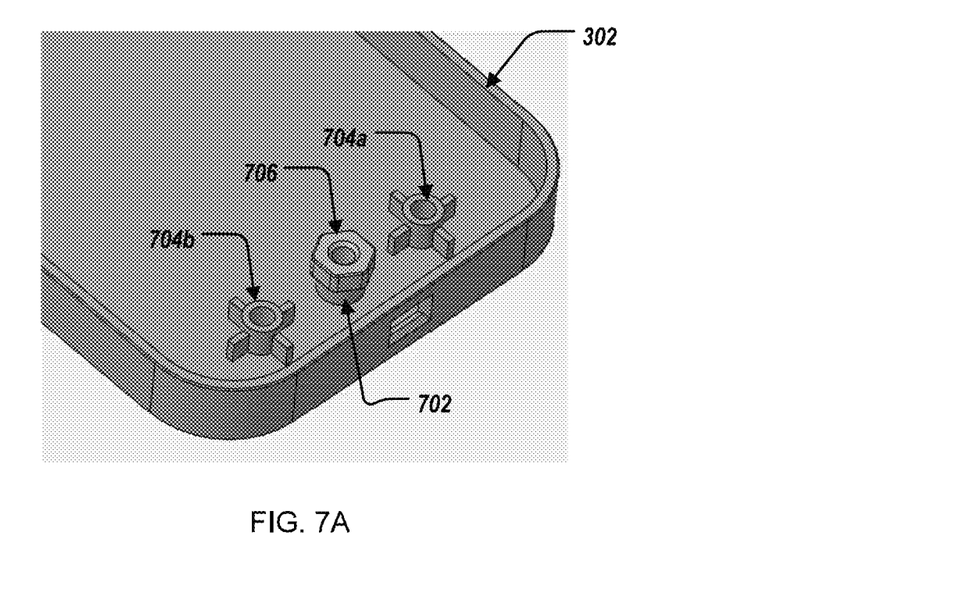
FIGS. 7A-7D illustrate a coupling of the assembly with a chassis of the computing system, and coupling of a bottom door with the assembly and the chassis.
Figure 7B:
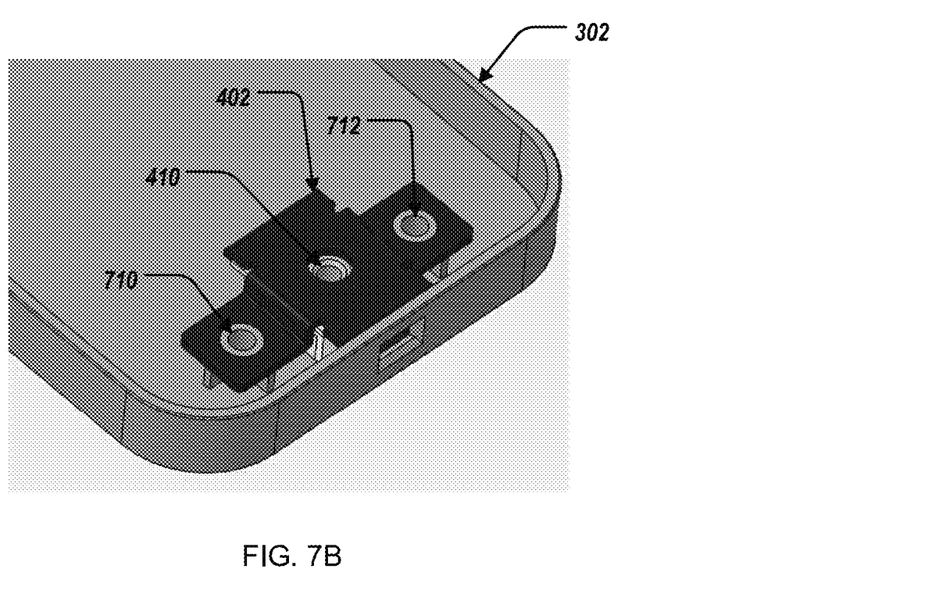
Figure 7C:
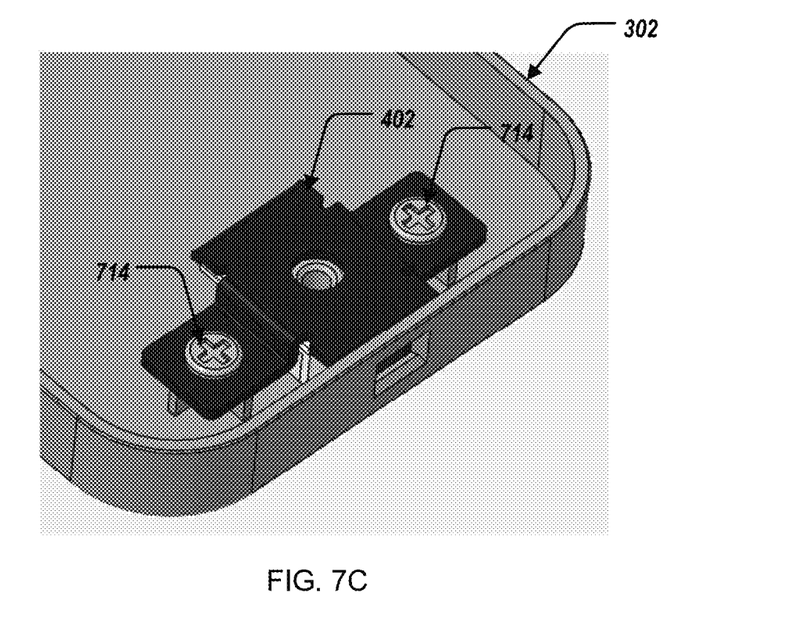
Figure 7D:
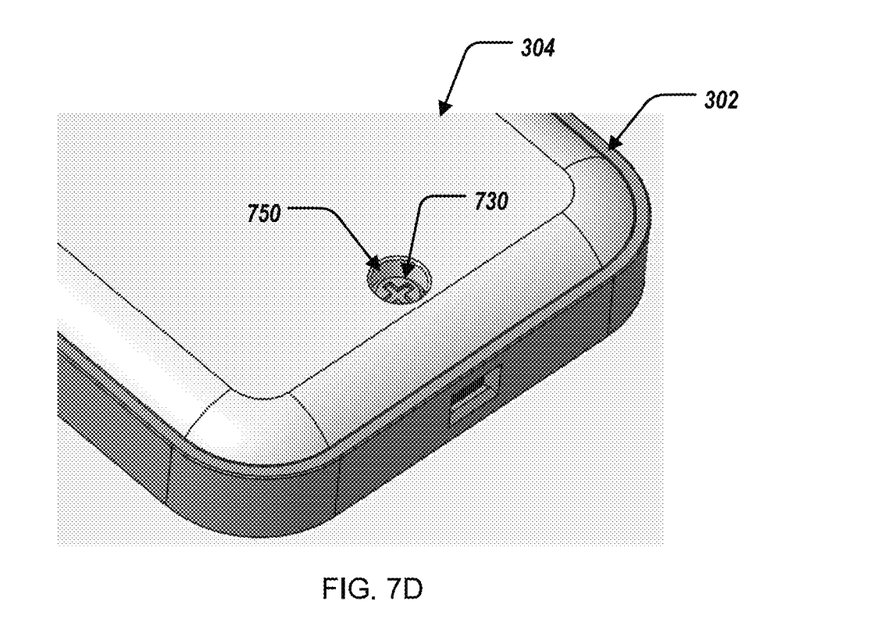

FIGS. 7A-7D illustrate a coupling of the assembly 400 with the chassis 302, and coupling of the bottom door 304 with the assembly 400 and the chassis 302. The chassis can further include a first threaded pillar 702 and second threaded pillars 704a, 704b (collectively referred to as second threaded pillars 704). The threaded pillars 702, 704 can include a threaded inner portion, e.g., for receiving a fastener such as a screw. FIG. 7A illustrates a nut 706 that is positioned on the pillar 702 of the chassis 302. The nut 706 can included a threaded opening. FIG. 7B illustrates the assembly 400 positioned on the chassis 302, and specifically, the opening 410 of the bracket 402 can be positioned in superimposition with the pillar 702 such that the nut 706 is positioned within the cavity 412 of the slider 404. Furthermore, additional holes 710, 712 of the bracket 402 can be in superimposition with the second threaded pillars 704. FIG. 7C illustrates fasteners 714 (e.g., screws 714) coupling the bracket 402 to the chassis 302 through the second threaded pillars 704. FIG. 7D illustrates the bottom door 304 coupled with the chassis 302, and specifically, a fastener 730 positioned through an opening 750 of the bottom door 304 and within the threaded opening of nut 706 such that the bottom door 304 abuts the chassis 302. Specifically, the fastener 730 can be positioned through the opening 750 of the bottom door 304, the opening 410 of the bracket 410, the cavity 412 of the slider 404, the threaded opening of the nut 706, and the threaded inner portion of the first threaded pillar 702.

Figure 8A:
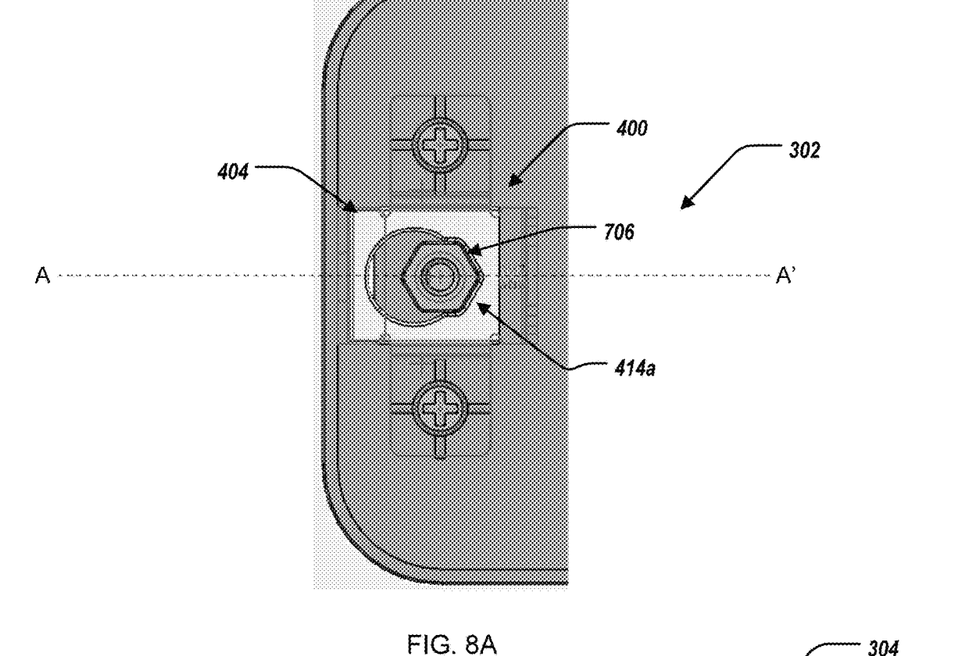
FIG. 8A illustrates a top down view of the assembly coupled to the chassis in a first positional state.
Figure 8B:
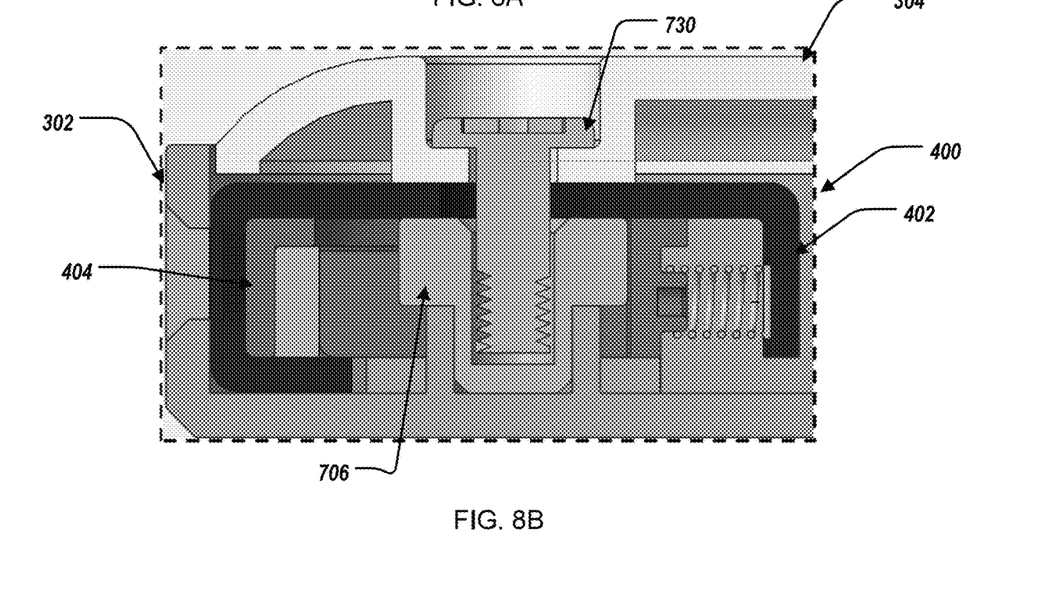
FIG. 8B illustrates a side view of the assembly coupled to the chassis as shown in FIG. 8A along the line A-A'.

FIG. 8A illustrates a top down view of the assembly 400 coupled to the chassis 302 (with illustration of bottom door 304 removed for ease of illustration); and FIG. 8B illustrates a side view of the assembly 400 coupled to the chassis as shown in FIG. 8A along the line A-A'. Specifically, FIGS. 8A, 8B illustrate the slider 404 in a first positional state with respect to the bracket 402. In particular, when the slider 404 is in the first positional state with respect to the bracket 402, the nut 706 is constrained (or fixed) within the cavity 412 of the slider 404, and in particular, the first cavity portion 414a of the cavity 412. The first cavity portion 414a can have a geometric shape that corresponds to the geometric shape of the nut 706 such that the nut 706 is rotationally fixed within the first cavity portion 414a (the nut 706 is coupled to the slider 404). When the slider 404 is in the first positional state with respect to the bracket 402 (as shown in FIG. 4), the fastener 730 can be removed from the nut 706 as the nut 706 is rotationally fixed (e.g., when the fastener 730 is rotated, the nut 706 is fixed such that the fastener 730 can be decoupled from the nut 706).

Figure 9A:
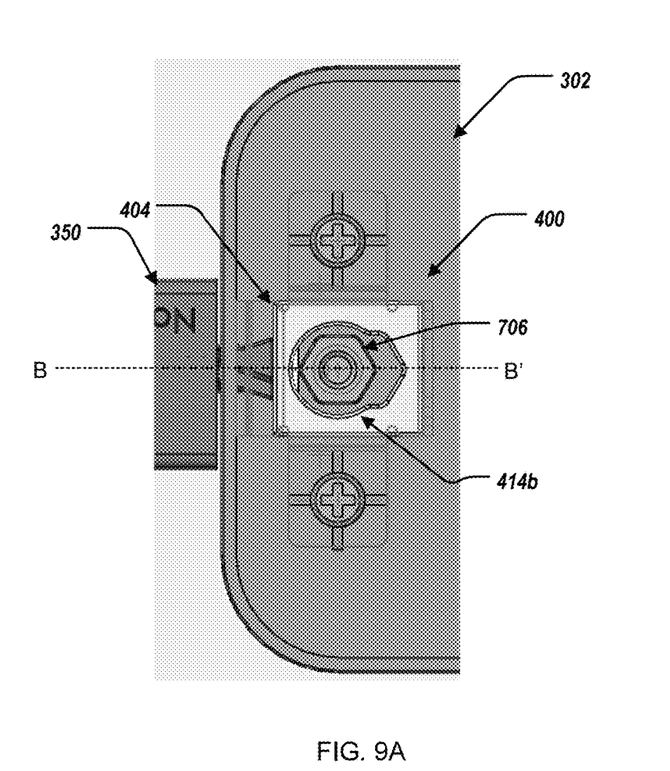
FIG. 9A illustrates a top down view of the assembly coupled to the chassis in a second positional state.
Figure 9B:
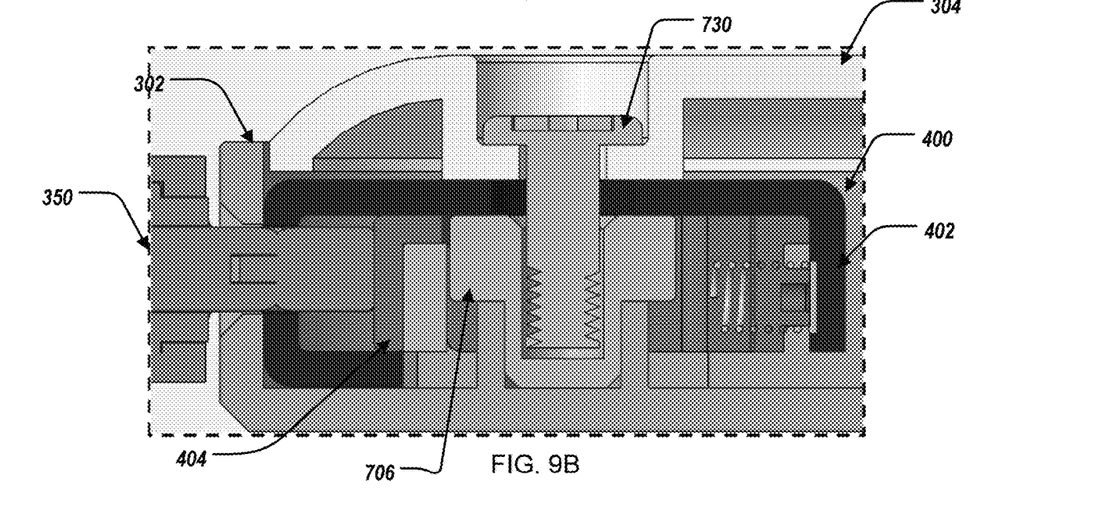
FIG. 9B illustrates a side view of the assembly coupled to the chassis as shown in FIG. 8A along the line B-B'.

FIG. 9A illustrates a top down view of the assembly 400 coupled to the chassis 302 (with illustration of bottom door 304 removed for ease of illustration); and FIG. 8B illustrates a side view of the assembly 400 coupled to the chassis as shown in FIG. 9A along the line B-B'. Specifically, FIGS. 9A, 9B illustrate the slider 404 in a second positional state with respect to the bracket 402. In particular, when the slider 404 is in the second positional state with respect to the bracket 402, the nut 706 is rotatable within the cavity of the slider 404, and in particular, the second cavity portion 414b of the cavity 412. The second cavity portion 414b can have a circular shape that is larger than the geometric shape of the nut 706 such that the nut 706 is rotatable within the second cavity portion 414b. When the slider 404 is in the second positional state with respect to the bracket 402 (as shown in FIG. 5), the fastener 730 can not be removed from the nut 706 as the nut 706 is rotatable (e.g., when the fastener 730 is rotated, the nut 706 rotates correspondingly such that the fastener 730 cannot be decoupled from the nut 706).

In some examples, the slider 404 can be transitioned from the first positional state to the second positional state with respect to the bracket 402; and can transition from the second positional state to the first positional state with respect to the bracket 402. Specifically, computing system 200 can further include a security lock 350, as shown in FIG. 3. The security lock 350 can be engaged with, or disengaged from, the computing system 200. Referring back to FIGS. 9A, 9B, the security lock 350 can be engage the slider 404 to transition the slider 404 from the first positional state to the second positional state with respect to the bracket 402. Specifically, the security lock 350 is insertable through the chassis 302 to engage the slider 404. When the security lock 350 engages the slider 404, the slider 404 transitions from the first positional state to the second positional state with respect to the bracket 402 (e.g., along the direction D1 as shown in FIG. 4). When the security lock 350 disengages the slider 404, the slider 404 transitions from the second positional state to the first positional state with respect to the bracket 402 (e.g., along the direction D2 as shown in FIG. 5).

In some examples, the spring 420 applies a tensional force to the slider 404 to facilitate transitioning the slider 404 from the second positional state to the first positional state with respect to the bracket 402. In some examples, the spring 420 maintains the slider 404 in the first positional state with respect to the bracket 402. In some examples, the magnetic portion 422 applies a magnetic force to the slider 404 to facilitate transitioning the slider 404 from the second positional state to the first positional state with respect to the bracket 402. In some examples, the magnetic portion 422 maintains the slider 404 in the first positional state with respect to the bracket 402.

Figure 10:
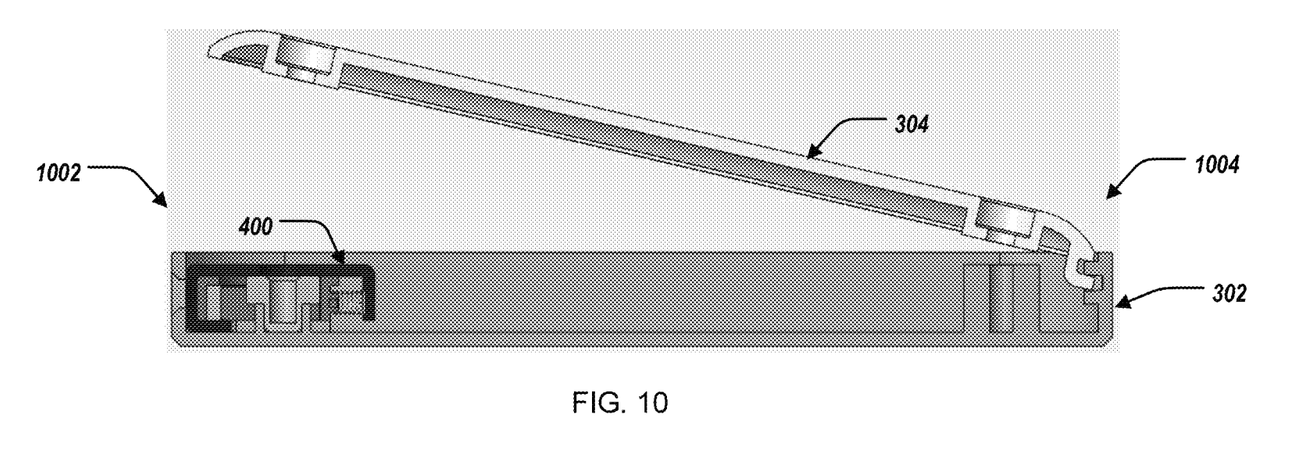
FIGS. 10, 11 illustrate coupling of the bottom door to the chassis of the computing system.
Figure 11:
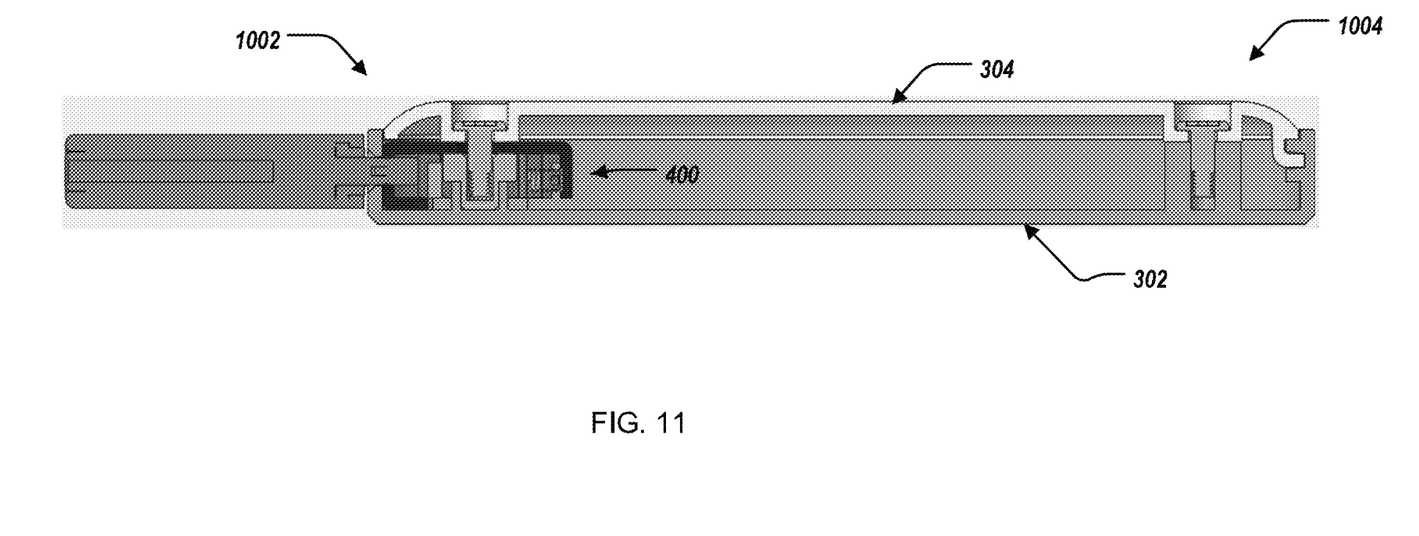

Referring to FIG. 10, the assembly 400 can be positioned at a first end 1002 of the computing system 200 opposite a second end 1004. The bottom door 304 is rotatable coupled to the chassis 302 at the second end 1004. In other words, the bottom door 304 is "towed-in" from the second end 1004 of the computing system 200. Once the bottom door 304 is towed in, as shown in FIG. 11, the bottom door 304 can be coupled to the chassis 302 using the assembly 400, as described further herein.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An information handling system, comprising:
a chassis;
a bottom door coupled to the chassis;
an assembly, comprising:
   a bracket coupled to the chassis, the bracket including an opening;
   a slider moveably coupled within the bracket, the slider including a cavity at least partially in superimposition with the opening;
   a nut positioned within the cavity, the nut including a threaded opening; and
   a fastener positioned through an opening of the bottom door and within the threaded opening of the nut to position the bottom door such that the bottom door abuts the chassis,
   a security lock that is insertable through the chassis, the security lock engaging and disengaging the slider;
   wherein when the security lock disengages the slider to place the slider in a first positional state with respect to the bracket, the nut is constrained within the cavity,
   wherein when the security lock engages the slider to place the slider in a second positional state with respect to the bracket, the nut is rotatable within the cavity.

2. The information handling system of claim 1, wherein the assembly further includes a spring positioned between the bracket and the slider, the spring applying a tensional force to the slider to facilitate transitioning the slider from the second positional state to the first positional state.

3. The information handling system of claim 2, wherein the spring maintains the slider in the first positional state.

4. The information handling system of claim 1, wherein the slider further includes a magnetic portion, the magnetic portion applying a magnetic force to the slider to facilitate transitioning the slider from the second positional state to the first positional state.

5. The information handling system of claim 4, wherein the magnet maintains the slider in the first positional state.

6. The information handling system of claim 1, wherein the assembly is positioned at a first end of the information handling system opposite a second end of the information handling system, wherein the bottom door is rotatable coupled to the chassis at the second end of the information handling system.

7. The information handling system of claim 1, wherein the cavity of the slider includes a first cavity portion and a second cavity portion, wherein when the slider is in the first positional state with respect to the bracket, the nut is positioned within the first cavity portion, and wherein when the slider is in in the second positional state with respect to the bracket, the nut is positioned within the second cavity portion.

8. The information handling system of claim 7, wherein the nut has a first geometric shape and the first cavity portion have a second geometric shape that couples the slider to the nut.

9. The information handling system of claim 8, wherein the second cavity portion has a third geometric shape that facilitates rotation of the nut within the second cavity portion.

10. The information handling system of claim 9, wherein the first and the second geometric shape is hexagonal, and the third geometric shape is circular.

11. A fastening mechanism, comprising:
an assembly, comprising:
   a bracket coupled to the chassis, the bracket including an opening;
   a slider moveably coupled within the bracket, the slider including a cavity at least partially in superimposition with the opening, the cavity includes a first cavity portion and a second cavity portion;
   a nut positioned within the cavity, the nut including a threaded opening; and
   a fastener positioned through an opening of the bottom door and within the threaded opening of the nut to position the bottom door such that the bottom door abuts the chassis,
   wherein when the slider is in a first positional state with respect to the bracket, the nut is constrained and positioned within the first cavity portion,
   wherein when the slider is in a second positional state with respect to the bracket, the nut is rotatable and positioned within the second cavity portion.

12. The fastening mechanism of claim 11, wherein the assembly further includes a spring positioned between the bracket and the slider, the spring applying a tensional force to the slider to facilitate transitioning the slider from the second positional state to the first positional state.

13. The fastening mechanism of claim 12, wherein the spring maintains the slider in the first positional state.

14. The fastening mechanism of claim 11, wherein the slider further includes a magnetic portion, the magnetic portion applying a magnetic force to the slider to facilitate transitioning the slider from the second positional state to the first positional state.

15. The fastening mechanism of claim 14, wherein the magnet maintains the slider in the first positional state.

16. The fastening mechanism of claim 11, wherein the nut has a first geometric shape and the first cavity portion have a second geometric shape that couples the slider to the nut.

17. The fastening mechanism of claim 16, wherein the second cavity portion has a third geometric shape that facilitates rotation of the nut within the second cavity portion.

* * * * *